US012717130B2

(12) United States Patent
Nabavi et al.

(10) Patent No.: US 12,717,130 B2
(45) Date of Patent: Aug. 25, 2026

(54) APPARATUS FOR PROTECTING AN OPTICAL DEVICE FROM CONTAMINATION

(71) Applicant: EXCELSENSE TECHNOLOGIES CORP., Richmond (CA)

(72) Inventors: Nima Nabavi, Vancouver (CA); Ian Law Bell, North Vancouver (CA); Joubin Nayeri, Burnaby (CA); Colin Alexander Nyuli, Vancouver (CA)

(73) Assignee: ExcelSense Technologies Corp., Vancouver (CA)

( * ) Notice: Subject to any disclaimer, the term of this patent is extended or adjusted under 35 U.S.C. 154(b) by 330 days.

(21) Appl. No.: 18/568,082

(22) PCT Filed: Jun. 2, 2022

(86) PCT No.: PCT/CA2022/000041

§ 371 (c)(1),
(2) Date: Dec. 7, 2023

(87) PCT Pub. No.: WO2023/272374

PCT Pub. Date: Jan. 5, 2023

(65) Prior Publication Data

US 2024/0272425 A1 Aug. 15, 2024

Related U.S. Application Data

(60) Provisional application No. 63/257,299, filed on Oct. 19, 2021, provisional application No. 63/208,125, filed on Jun. 8, 2021.

(51) Int. Cl.
*G02B 27/00* (2006.01)
*B08B 1/16* (2024.01)
(Continued)

(52) U.S. Cl.
CPC ............ *G02B 27/0006* (2013.01); *B08B 1/16* (2024.01); *B08B 1/20* (2024.01); *B08B 3/041* (2013.01); *B08B 7/0014* (2013.01); *B08B 17/025* (2013.01)

(58) Field of Classification Search
CPC ...... G02B 27/0006; G02B 27/00; G02B 1/18; B08B 1/16; B08B 1/20; B08B 3/041;
(Continued)

(56) References Cited

U.S. PATENT DOCUMENTS 5,068,770 A 11/1991 Baziuk
6,138,319 A 10/2000 Benoit
(Continued)

FOREIGN PATENT DOCUMENTS

CN 105329019 A 2/2016
CN 209167572 U 7/2019
(Continued)

OTHER PUBLICATIONS

Extended European Search Report issued in European Appln. No. 22831088.4 mailed Mar. 18, 2025.
(Continued)

*Primary Examiner* — Arnel C Lavarias

(57) ABSTRACT

An apparatus for protecting an optical device from contamination includes a window disposed between the optical device and a contaminating environment, the window is rotatable about a rotational axis and includes a spherical surface. A bezel encloses a portion of the surface and defines a clear aperture for transmission of electromagnetic radiation. A seal extends around the clear aperture and conforms to the surface. An actuator causes relative rotation between the window and the bezel to move the surface with regards to the bezel. The seal dispenses a film onto portions of the surface that enter the clear aperture during rotation, the film
(Continued)

being operable to reduce bonding of contaminants to the surface while transmitting the electromagnetic radiation to or from the optical device. The seal is configured to dislodge contaminants entrained in the film or adhered to portions of the surface moving out of the clear aperture during rotation.

34 Claims, 8 Drawing Sheets

(51) Int. Cl.

| | |
|---|---|
| ***B08B 1/20*** | (2024.01) |
| ***B08B 3/04*** | (2006.01) |
| ***B08B 7/00*** | (2006.01) |
| ***B08B 17/02*** | (2006.01) |

(58) Field of Classification Search

CPC ....... B08B 7/0014; B08B 17/025; B08B 1/10; B08B 1/165; B08B 1/40; B08B 3/04; B08B 17/00; B08B 17/02

USPC ................ 359/508, 507, 509, 513, 514, 896

See application file for complete search history.

(56) References Cited

U.S. PATENT DOCUMENTS

| | | | | |
|---|---|---|---|---|
| 6,607,606 | B2 | 8/2003 | Bronson | |
| 8,234,740 | B2 | 8/2012 | Kereth | |
| 10,179,571 | B1 | 1/2019 | Matesic et al. | |
| 2004/0086427 | A1 | 5/2004 | Childers et al. | |
| 2009/0229067 | A1 | 9/2009 | Becker et al. | |
| 2012/0243093 | A1 | 9/2012 | Tonar et al. | |
| 2015/0216402 | A1 * | 8/2015 | Ray | A61B 1/00096 600/109 |
| 2017/0239693 | A1 | 8/2017 | Nabavi | |
| 2018/0086316 | A1 | 3/2018 | Trebouet et al. | |
| 2021/0162958 | A1 | 6/2021 | Kim | |
| 2021/0370303 | A1 | 12/2021 | Xu et al. | |
| 2023/0333366 | A1 | 10/2023 | Nabavi et al. | |

FOREIGN PATENT DOCUMENTS

| | | | | | |
|---|---|---|---|---|---|
| CN | 110775294 | A | * | 2/2020 | B64F 5/305 |
| DE | 2020436 | A1 | | 4/1972 | |
| DE | 202005016941 | U1 | | 3/2007 | |
| DE | 102018202363 | A1 | | 8/2019 | |
| DE | 202018107266 | U1 | | 4/2020 | |
| EP | 3206806 | A1 | | 8/2017 | |
| EP | 3625624 | A1 | | 3/2020 | |
| JP | 2006176028 | A | | 7/2006 | |
| JP | 2008535351 | A | | 8/2008 | |
| JP | 2015214269 | A | | 12/2015 | |
| KR | 1020200089587 | A | | 7/2020 | |
| WO | 2021131122 | A1 | | 7/2021 | |
| WO | 2021258197 | A1 | | 12/2021 | |

OTHER PUBLICATIONS

Office Action issued in U.S. Appl. No. 18/002,855 mailed on Jun. 23, 2025.

International Search Report issued in Intl. Appln. No. PCT/CA2022/000041 mailed Dec. 8, 2022.

Written Opinion issued in Intl. Appln. No. PCT/CA2022/000041 mailed Dec. 8, 2022.

"Orlaco Backup Camera for Heavy Machinery—RMT Equipment", Jul. 28, 2021, retrieved from https://web.archive.org/web/20210728192940/https://rmtequip.com/en/products/orlaco-all-time-vision-camera on Dec. 5, 2023, 5 pages.

"Self Cleaning Camera—XClear Outdoor PTZ Camera Housing", Jul. 28, 2021, retrieved from https://web.archive.org/web/20210728171133/https://www.xstreamdesigns.com/xclear-self-cleaning-outdoor-ptz-camera-housings on Dec. 5, 2023, 11 pages.

International Search Report issued in Intl. Appln. No. PCT/CA2021/050851 mailed Sep. 23, 2021.

Written Opinion issued in Intl. Appln. No. PCT/CA2021/050851 mailed Sep. 23, 2021.

Office Action issued in Japanese Patent Application No. 2024-510651 mailed on Mar. 3, 2026.

Final Office Action issued in U.S. Appl. No. 18/002,855 mailed on Apr. 9, 2026.

Mercedes-Benz; "What is Mercedes-Benz Magic Vision Control®?" dated Jun. 19, 2017, retrieved from https://www.arrowheadmb.com/blog/what-is-mercedes-benz-magic-vision-control/ on Apr. 21, 2026.

* cited by examiner

APPARATUS FOR PROTECTING AN OPTICAL DEVICE FROM CONTAMINATION

BACKGROUND

1. Field

This disclosure relates generally to optical devices and more particularly to the cleaning of an optical surface in an optical device.

2. Description of Related Art

Cameras, rangefinders, and other optical devices generally have at least one optical surface exposed to the surrounding environment. The exposed optical surface may be an outer surface of an optical grade window, a lens, or other optical element that encloses a housing and transmits light to or from the optical device within the housing. The optical element thus protects sensitive optical components enclosed within the housing. The exposed optical surface may however accumulate contaminants such as water, dust particles, and other debris over time that degrade optical performance. In cases where the optical surface is exposed to a harsh environment the optical surface may become too quickly contaminated to rely on periodic manual cleaning. This is particularly problematic in mining and other industrial environments, or for installations in remote locations where it is difficult or dangerous to access the optical device for manual cleaning. In some applications, a lack of access for manual cleaning may actually prohibit deployment of the optical device.

There remains a need for apparatus and methods for performing automated cleaning of optical surfaces.

SUMMARY

In accordance with one disclosed aspect there is provided an apparatus for protecting an optical device from contamination. The apparatus includes a window disposed between the optical device and a contaminating environment, the window being rotatable about a rotational axis and including an outwardly facing surface that is curved in at least one direction about the rotational axis. The apparatus also includes a bezel enclosing a portion of the outwardly facing surface and defining a clear aperture for transmission of electromagnetic radiation to or from the optical device. The bezel includes a seal extending around a periphery of the clear aperture and is configured to cause the seal to conform to the outwardly facing surface when the window and bezel are urged into contact with each other. The apparatus also includes an actuator configured to cause relative rotation between the window and the bezel to cause the outwardly facing surface to move with respect to the bezel. The apparatus further includes a seal configured to dispense a film onto a portion of the outwardly facing surface that enters the clear aperture during the relative rotation, the film being operable to reduce bonding of optical contaminants to the outwardly facing surface within the clear aperture while transmitting the electromagnetic radiation to or from the optical device through the clear aperture. The seal is configured to dislodge contaminants entrained in the film or adhered to a portion of the outwardly facing surface moving out of the clear aperture during the relative rotation.

The outwardly facing surface may be circularly curved in the at least one direction about the rotational axis.

The film may include a liquid film that remains in a liquid state after being dispensed.

The apparatus may include a liquid reservoir in liquid communication with the seal and the seal may be configured to dispense a thin film of liquid under the seal during relative rotation between the window and the bezel while containing liquid in the liquid reservoir when there is no rotation between the window and the bezel.

The window and optical device may be enclosed within a housing and the liquid reservoir may be defined within a portion of the housing extending from the seal in the bezel, along a portion of the outwardly facing surface of the window that is disposed within the housing, and to a rear seal disposed to contain the liquid in the liquid reservoir and prevent the liquid reaching other portions of the housing.

The film may include one of a liquid material that at least partly cures after being dispensed, a liquid material and a non-liquid material, the liquid material being operable to at least partially evaporate after being dispensed, or a non-liquid material that may be dispensed by being abraded from the seal to form the film during the relative rotation.

The seal may include a dispenser portion operable to dispense the film onto the portion of the outwardly facing surface that enters the clear aperture during rotation of the window, and a wiper portion operable to dislodge the contaminants entrained in the film or adhered to the portion of the outwardly facing surface moving out of the clear aperture during rotation of the window.

The dispenser portion of the seal and the wiper portion of the seal may be disposed at opposite sides of the bezel and the rotation of the window may be in a direction to cause the outwardly facing surface to move toward the wiper portion of the seal.

The wiper portion of the seal may include a wiper extending around a full periphery of the clear aperture and the dispenser portion of the seal may include a separate seal disposed spaced outwardly from the wiper.

The optical device and the window may be enclosed within a housing and the bezel may include a portion of the housing.

The apparatus may include a compliant structure acting on the window and configured to provide a force for urging the window into contact with the bezel.

The outwardly facing surface may be circularly curved in the at least one direction about the rotational axis and the outwardly facing surface is further circularly curved in a direction orthogonal to the at least one direction to define a spherical outwardly facing surface and the bezel may include a circular bezel.

The actuator may be configured to cause rotation of the window in a single direction about the rotational axis and the rotation causes the seal to dislodge contaminants from a first portion of the outwardly facing surface moving out of the clear aperture while the dispenser replenishes the film on a second portion of outwardly facing surface of entering the clear aperture.

The window may include a spherical solid and the optical device may be disposed behind the spherical solid and the electromagnetic radiation may be transmitted to or from the optical device through the clear aperture and the spherical solid.

The apparatus may include a volume of immersion liquid contained between a portion of the spherical solid and a first optical element of the optical device, the immersion liquid having a refractive index that is selected to substantially match a refractive index of the spherical solid.

The spherical solid may include a recess disposed within the spherical solid and the optical device may be at least partially disposed within the recess.

The window may include an inwardly facing surface that may be curved in the at least one direction about the rotational axis to define a curved wall between the outwardly facing surface and the inwardly facing surface.

The curved wall may extend beyond the clear aperture and the actuator may be configured to cause a reciprocating rotation of the window about the rotational axis, rotation in a first direction may cause the seal to dislodge contaminants when a first portion of the outwardly facing surface moves out of the clear aperture and rotation in a second direction may cause the seal to dispense the film onto the first portion of the outwardly facing surface while reentering the clear aperture.

The seal may enclose the clear aperture and the rotation in the first direction may cause the seal to dispense the film onto a second portion of the outwardly facing surface entering the clear aperture and the rotation in the second direction may cause the seal to dislodge contaminants entrained in the film or adhered to the second portion of the outwardly facing surface while moving out of the clear aperture.

The curved wall of the window may include a spherical shell extending about the rotational axis to define an enclosed region within the curved wall.

The apparatus may include at least one optical element disposed within the enclosed region to transmit the electromagnetic radiation to the optical device.

The optical device may be disposed outside the enclosed region and the optical element may include one of one or more lenses configured to condition the electromagnetic radiation being transmitted to or from the optical device, or a mirror including a reflective surface disposed to redirect the electromagnetic radiation impinging on the reflective surface to or from the optical device.

The optical device may be disposed outside the enclosed region and the spherical shell may include at least one opening and the at least one optical element may be mounted on a support structure extending through the at least one opening into the enclosed region to support the at least one optical element in fixed relation to the optical device.

The apparatus may include an immersion liquid received within the enclosed region, the immersion liquid having a refractive index that is substantially matched to a refractive index of the window.

The optical device may be disposed within the enclosed region.

The outwardly facing surface of the window may include a cylindrical surface.

The cylindrical surface may include a circular cylindrical surface.

The electromagnetic radiation transmitted to or from the optical device may include electromagnetic radiation having a wavelength in at least one of an ultraviolet range of wavelengths, a visible range of wavelengths, an infrared range of wavelengths, a long-Wave infrared range of wavelengths, or an x-ray range of wavelengths.

The actuator may be configured to cause one of a continuous relative rotation, an intermittent relative rotation, or a relative rotation in one direction followed by a relative rotation in an opposite direction.

The window may include a shell including a spherical outwardly facing surface and the bezel may include a circular bezel and the actuator may be configured to cause rotation of the window about a rotational axis that is aligned at an acute angle to an optical axis of the imaging device to cause the outwardly facing surface to move through the clear aperture.

The shell may include one of a spherical inwardly facing surface or an aspherical inwardly facing surface.

The optical device may be disposed within the shell behind the one of the spherical inwardly facing surface or the aspherical inwardly facing surface.

The rotational axis may pass through a point outside of the clear aperture.

A direction of rotation of the window about the rotational axis may be selected to cause the window to move in a direction with respect to the bezel such that the contaminants move downwardly out of the clear aperture.

The apparatus may include an actuator configured to generate a secondary motion to dislodge at least some contaminants built up at a periphery of the clear aperture.

The seal may be fabricated in a circular shape and the seal may be mounted within the bezel to cause the seal to be urged into a non-circular shape.

The optical device may include a plurality of optical devices configured to emit or receive the electromagnetic radiation.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1A:
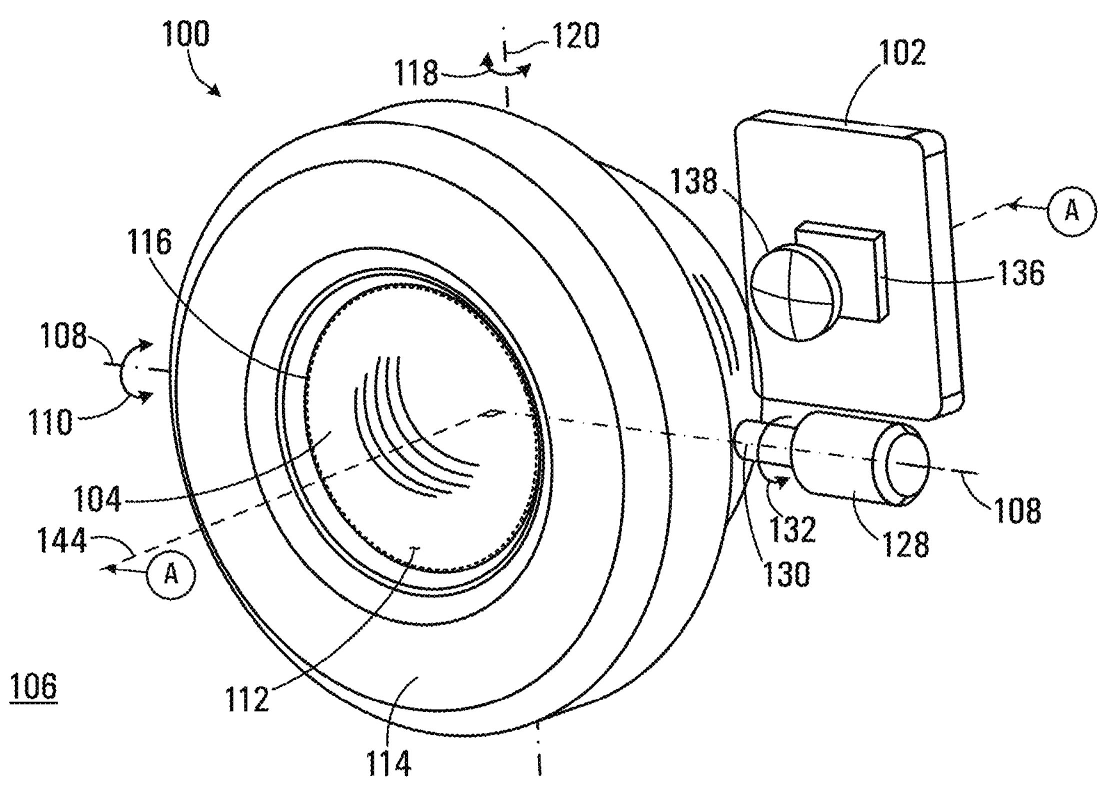
FIG. 1A is a perspective view of an apparatus for protecting an optical device from contamination according to a first disclosed embodiment.

Referring to FIG. 1A, an apparatus for protecting an optical device 102 from contamination according to a first disclosed embodiment is shown generally at 100. The apparatus 100 includes a window 104 disposed between the optical device 102 and a contaminating environment 106. The window 104 is rotatable about a rotational axis 108, as indicated by the arrow 110. The window 104 includes an outwardly facing surface 112 that is curved in at least one direction about the rotational axis 108. The apparatus 100 also includes a bezel 114 enclosing a portion of the outwardly facing surface 112 and defining a clear aperture 116 (shown in broken lines) for transmission of electromagnetic radiation such as light to or from the optical device 102 through the window 104. The optical device 102 has an optical axis indicated by a line 144.

In this embodiment the window 104 is fabricated from a substantially optically transparent material over an operating wavelength range associated with the optical device 102. The term "substantially optically transparent" should be taken to refer to a material that has a low attenuation of light passing through the optical device 102. In this context, the term "light" when used herein should be understood to refer to electromagnetic radiation having wavelengths in the visible, infrared, ultraviolet, or x-ray wavelength ranges. In some embodiments the wavelength range may be any of an ultraviolet range of wavelengths, a visible range of wavelengths, an infrared range of wavelengths, a long-wave infrared range of wavelengths, or an x-ray range of wavelengths.

In the embodiment shown the outwardly facing surface 112 is circularly curved in the direction 110 about the rotational axis 108. In this embodiment the outwardly facing surface 112 is also circularly curved in a direction indicated by the arrow 118 about a rotational axis 120 orthogonal to the axis 108, thus defining a spherical outwardly facing surface 112. In the embodiment shown where the window 104 has a spherical outwardly facing surface 112, the bezel 114 has a substantially circular shape.

Figure 1B:
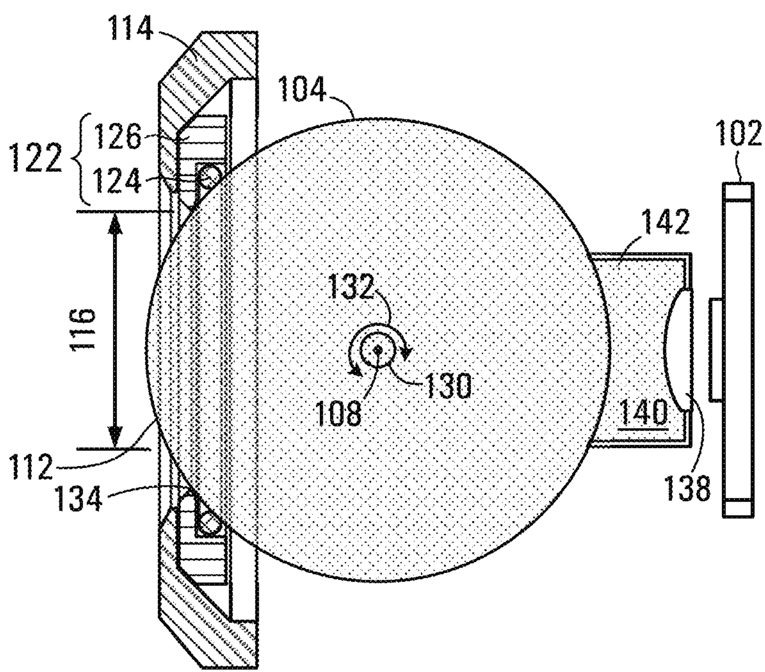
FIG. 1B is a cross-sectional view of the apparatus for protecting an optical device from contamination taken along the line A-A in FIG. 1A.

The apparatus 100 is shown in cross-sectional view in FIG. 1B, taken along a line A-A coincident with the optical axis line 144 in FIG. 1A. Generally the apparatus 100 would be enclosed in a housing, however in FIG. 1A and FIG. 1B the housing is omitted to reveal elements of the apparatus 100 that would be obscured by the housing. The bezel 114 includes a seal 122 extending around a periphery of the clear aperture 116. The bezel 114 is configured to cause the seal 122 to conform to the outwardly facing surface 112 when the window 104 and bezel 114 are urged into contact with each other. In the embodiment shown, the seal 122 includes a separate dispenser portion 124 and a wiper portion 126. In other embodiments the seal 122 may be a unitary element that provides the functions described in more detail below.

Referring back to FIG. 1A, the apparatus 100 also includes an actuator 128 operable to cause relative rotation between the window 104 and the bezel 114. In the embodiment shown the rotation is about the rotational axis 108, which in this embodiment is perpendicular to the optical axis 144. The actuator 128 may be implemented using a motor, which is coupled via a shaft 130 to the window 104. The actuator is operable to deliver a rotational torque 132 to the window via the shaft 130, which causes the outwardly facing surface 112 to move with respect to the bezel 114. The torque 132 may be applied to cause rotation in a clockwise direction, an anticlockwise direction, or as a combination of rotations in the clockwise and anticlockwise directions. The rotation may be either continuous or intermittent or any combination of both.

Referring again to FIG. 1B, in the embodiment shown the rotational torque 132 delivered to the shaft 130 by the actuator 128 causes a portion of the outwardly facing surface 112 to move downwardly to enter the clear aperture 116. In other embodiments the movement of the outwardly facing surface 112 may be upward, lateral, or may be a reciprocating movement as described in more detail below. During the relative rotation, the seal 122 dispenses a film onto a portion of the outwardly facing surface 112 that enters the clear aperture 116 (in this case at the top of the clear aperture). The film is operable to reduce bonding of optical contaminants to the outwardly facing surface within the clear aperture 116 while transmitting light to or from the optical device 102 through the clear aperture.

In one embodiment the film may be a liquid film and the dispenser portion 124 of the seal 122 may be configured to primarily perform the function of dispensing a thin and substantially uniform film on the outwardly facing surface 112 of the window 104. Various configurations of a suitable dispenser portion 124 of the seal 122 are disclosed in commonly owned United States provisional patent application U.S. 63/042,472 entitled "Apparatus for Cleaning an Optical Surface in an Optical Device", filed on Jun. 22, 2020, and incorporated herein by reference in its entirety. Also disclosed in U.S. 63/042,472 are suitable liquids for providing a liquid film, which may have properties that cause the liquid to uniformly wet the outwardly facing surface 112 of the window 104. The suitable liquids may remain stable under environmental conditions that the apparatus 100 will be subjected to. It may also be desirable that adhesive forces between the liquid and the outwardly facing surface 112 are greater than adhesive forces between the liquid and typical contaminants. Under these conditions many typical contaminant particles will tend to float within the liquid film rather than adhere to the outwardly facing surface 112. Other liquid properties that may be desirable depending on the application include stable viscosity, low vapor pressure, and hydrolytic stability.

In one embodiment the liquid may be a hydraulic oil. In some embodiments the hydraulic oil may include constituents such as silicone that cause the liquid film to have hydrophobic characteristics, which reduces the likelihood of water becoming entrained within the liquid film. These liquids will tend to cause water droplets to float on top of the liquid film, where they can be easily removed by the wiper 126, rather than pass under the wiper. Additionally, the liquid should also have suitable optical properties. As an example, the liquid may be selected based on high optical transmittance over a wavelength range associated with the optical device 102. The liquid may also be selected to have a refractive index that is close to a refractive index of the material of the window 104, which reduces the optical effect of scratches in the outwardly facing surface 112.

The liquid film may remain in the liquid state after being dispensed on the outwardly facing surface 112 and will cause a negligible or minor degradation to images captured through the liquid film. In other embodiments the selected liquid material may at least partly cure after being dispensed. Alternatively, the liquid material may include a non-liquid material and the liquid material may at least partially evaporate after being dispensed, leaving the non-liquid material on the outwardly facing surface 112.

In other embodiments a non-liquid material may be dispensed by being abraded from the seal 122 to form the film during the relative rotation. As an example, the entire seal 122 or the dispenser portion 124 of the seal may be fabricated from a material that when dragged across the outwardly facing surface 112 leaves a film behind. One example of such materials are polysiloxane based materials, which may be fabricated in various forms and may include cross-linked polymers that may be used as a sealing element.

The seal 122 is also configured to dislodge the contaminants entrained in the film or adhered to a portion of the outwardly facing surface 112 moving out of the clear aperture 116 during the relative rotation (in this case at the bottom of the clear aperture 116). In this embodiment the wiper portion 126 of the seal 122 primarily performs this function and the wiper portion includes an edge 134 that closely contacts the outwardly facing surface 112 and causes the film and contaminants to be lifted off the outwardly facing surface. Various configurations of suitable wiper portions 126 are disclosed in U.S. provisional patent application 63/042,472. In the embodiment shown in FIG. 1A and FIG. 1B, the wiper portion 126 extends around a full periphery of the clear aperture 116. The dispenser portion 124 includes a separate sealing element disposed spaced outwardly from the wiper portion 126. In some embodiments the wiper portion 126 may be fabricated from compliant material such as, polyurethane, polyethylene (UHMW), or acetal (Delrin®). In some embodiments the material of the seal 122 may be further treated to further improve its properties to prevent the likelihood of contaminants building up and becoming attached to the seal. The treatment may be applied to either the wiper 126 or the dispenser portion 124 or to both the wiper and dispenser portions. It is generally desirable to have the contaminants directed away from the clear aperture of the window and hydrophobic treatment of at the seal may help prevent buildup due to contaminants adhering to the wiper or dispenser material. The treatment may involve various processing or application of coatings to the wiper 124 and/or dispenser portion 126 of the seal 122 to reduce friction or change oleophobic or hydrophobic properties, for example.

In some embodiments, contaminants that are removed from the clear aperture 116 may inevitably build up at a peripheral edge of the outwardly facing surface 112 over time. This contaminant buildup may typically be in a lower region of the clear aperture 116, particularly for embodiments where the wiper portion is located to prevent re-deposit on the outwardly facing surface 112 under forces of gravity. In one embodiment, the apparatus 100 may generate a secondary motion to periodically attempt to dislodge any buildup of contaminants and direct these away from the clear aperture 116. The secondary motion may take the form of an impact or vibration delivered by an actuator to a housing of the apparatus 100, the bezel 114, the window 104, or other components associated with cleaning the clear aperture 116. The actuator may be a vibration motor, piezoelectric actuator, a solenoid, or other device capable of generating the secondary motion. In one embodiment the window rotation actuator 128 may be controlled to generate a small oscillating secondary movement to the window 104. The oscillating movement with respect to the contaminant buildup at the edge of the clear aperture 116 may be sufficient to dislodge at least some of the contaminants.

Some contaminant particles may adhere directly to the outwardly facing surface 112 and these contaminant particles may be more difficult to dislodge. Additionally, some tenacious contaminants, such as tree sap or resin, can be very difficult to dislodge once adhered to the outwardly facing surface 112. In embodiments where the likely contaminants include these more tenacious contaminants, the wiper may be fabricated from a metallic material. For example, the wiper portion 126 may be fabricated from a metallic material such as a brass alloy, stainless steel alloy, or a porous metal alloy impregnated with a lubricant.

In the embodiment shown in FIGS. 1A and 1B, window 104 is fabricated as a spherical solid from an optically transparent material. The optical device 102 is disposed behind the window 104 and light is transmitted to or from the optical device through the clear aperture 116 and the window 104. In this embodiment, the optical device 102 includes a sensor 136 and a lens 138, which is disposed between the window 104 and the optical device 102 for conditioning and directing light onto the sensor 136. The solid spherical window 104 has a focal length that is proportional to the radius of the sphere and the lens 138 would have to be configured to work in combination with the window 104 to direct light onto the sensor 136. The lens 138 may thus include a plurality of lens elements, at least some of which are included to correct for the presence of the spherical window.

In one embodiment the apparatus 100 may include a volume of immersion liquid 140 contained within a chamber 142 between a rear portion of the spherical solid window 104 and a first optical element of the optical device (i.e. the lens 138). When the immersion liquid is selected to have a refractive index that matches a refractive index of the window 104, the optical effect of the rear surface of the spherical window 104 is effectively removed, thus reducing the potential for introduction of optical aberrations, and simplifying the design of the lens 138. The refractive index of the immersion liquid need not be an exact match and as long as the immersion liquid has a refractive index that is closer to the refractive index of the window material than air (refractive index of around 1.0), the optical effect of the rear surface of the window will be reduced.

Figure 1C:
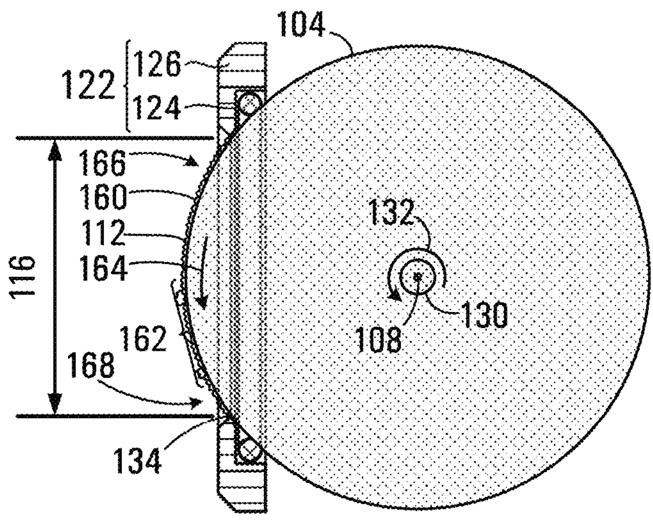
FIG. 1C is a further cross-sectional view of the apparatus of FIG. 1A.

Referring to FIG. 1C, a portion of the apparatus 100 is shown with a film 160 having been dispensed onto the outwardly facing surface 112 of the window 104. Several contaminant particles 162 are also shown entrained or embedded within the film 160. In this embodiment the apparatus 100 is configured to cause rotation of the window about the rotational axis 108 in a single anticlockwise direction in the direction of the applied torque 132. The rotation 132 causes the outwardly facing surface 112 of the window 104 to move in the direction indicated by the arrow 164, such that the wiper portion 126 of the seal 122 dislodges the contaminants 162 from a first portion 168 of the outwardly facing surface that is moving out of the clear aperture. Simultaneously, the dispenser portion 124 of the seal 122 replenishes the film on a second portion of outwardly facing surface of entering the clear aperture. This embodiment has an advantage in that, if the apparatus is oriented as shown in FIG. 1A-1C, any removed contaminants 162 that accumulate at the edge 134 of the wiper 126 will be less likely to redeposit within the clear aperture 116. As an example, if the rotational direction were reversed such that contaminants accumulate at the upper edge of the clear aperture 116, these could potentially re-deposit on the outwardly facing surface 112 under forces of gravity.

Figure 2:
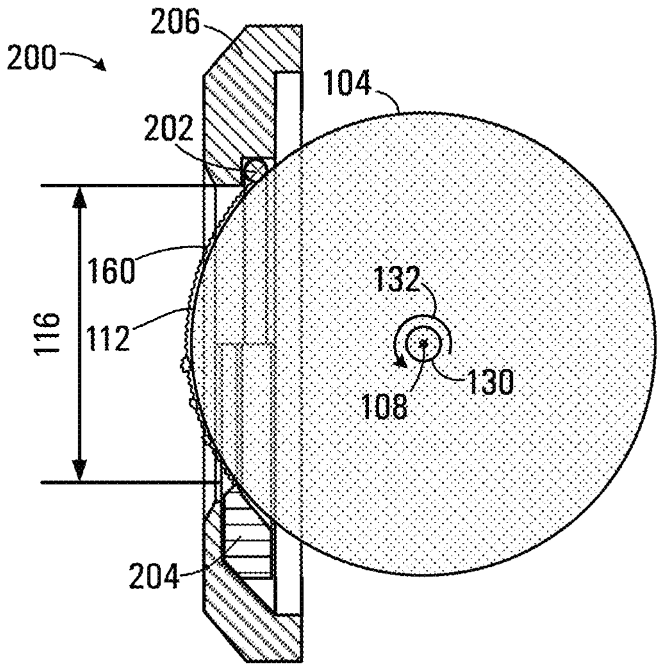
FIG. 2 is a cross-sectional view of an apparatus for protecting an optical device from contamination in accordance with an alternative disclosed embodiment.

In the embodiments shown in FIG. 1A-1C, the wiper 126 and dispenser portion 124 of the seal 122 extend around the entire clear aperture 116. In an alternative embodiment shown at 200 in FIG. 2, the seal is configured to include a dispenser 202 and a wiper 204, each being disposed on opposite sides of a modified bezel 206. An upper portion of the bezel 206 is modified to receive the dispenser 202, while the dispenser is omitted in a lower portion of the bezel. The dispenser 202 and wiper 204 may be fabricated separately or may be an integrally molded seal. The dispenser 202 may extend around an upper semi-circular perimeter portion of the clear aperture 116 while the wiper 204 extends around a lower semi-circular perimeter portion of the clear aperture 116. Alternatively, the proportions of the clear aperture 116 occupied by the dispenser 202 and wiper 204 may be unequal. Rotation of the window 104 in the direction caused by the applied torque 132 causes the outwardly facing surface 112 to move toward the wiper 204 for dislodging contaminants and away from the dispenser 202 for dispensing the film 160, generally as described in connection with the FIG. 1C embodiment.

Figure 3:
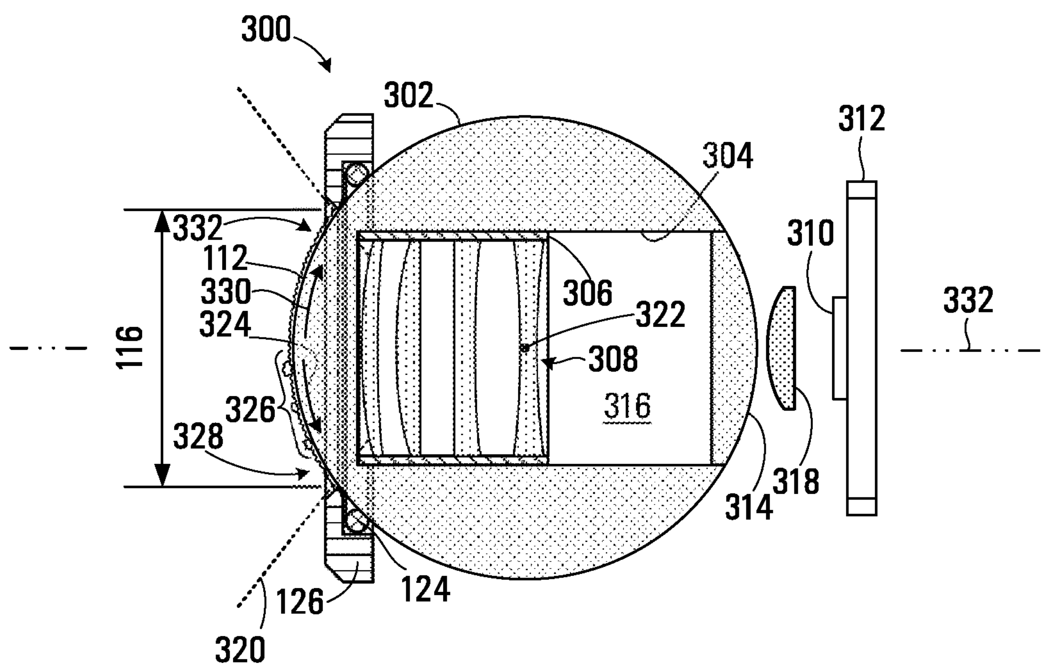
FIG. 3 is a cross-sectional view of another embodiment of an apparatus for protecting an optical device from contamination.

Referring to FIG. 3, an alternative embodiment of an apparatus for protecting an optical device is shown generally at 300 in FIG. 3. The apparatus 300 includes a window 302 fabricated as a spherical solid. The window 302 includes a recess 304 that is formed in the solid for receiving a lens tube 306 including one or more lenses 308 for forming an image on a sensor 310 of an optical device 312. In one embodiment the window 302 may be fabricated by boring the recess 304 into a solid sphere. In this embodiment, after the lens tube 306 is inserted and secured within the recess 304, a cap 314 is bonded within a rearward end of the recess to provide an enclosed region 316 within the window 302. The cap 314 may be formed or subsequently ground to retain the spherical shape of the window 302. In the embodiment shown in FIG. 3, the sensor 310 portion of the optical device 312 remains outside of the recess. In some embodiments, one or more additional optical elements 318 may be disposed between the sensor 310 and the lens tube 306 within the recess.

The embodiment of FIG. 3 has an advantage of disposing the lens tube 306 and lenses 308 close to the clear aperture 116 thus facilitating light capture from a wide field of view. A potential field of view through the clear aperture 116 is indicated by the broken lines 320 in FIG. 3.

In operation of the apparatus 300, an actuator (not shown) may be configured to cause a reciprocating rotation of the window 302 about a rotational axis 322. Rotation in a first direction 324 causes a lower portion of the wiper 126 to dislodge contaminants 326 when a first portion 328 of the outwardly facing surface 112 moves out of the clear aperture 116. Subsequent rotation in a second direction 330 causes the dispenser portion 124 to dispense a film onto the first portion 328 of the outwardly facing surface 112 while reentering the clear aperture 116. During the reciprocating rotation, the lens tube 306 is moved off axis and lenses 308 will be inoperable to direct light to the sensor 310. Operation of the optical device 312 is thus interrupted during the cleaning cycle. A rotational stop (not shown) may be required to ensure that the lens tube 306 returns to a position sufficiently aligned with an imaging axis 332 of the optical device 312 to meet imaging tolerances. While the FIG. 3 embodiment has been described for reciprocating rotation of the window 302 about the rotational axis 322, the rotation of the window may also be in a single rotational direction.

In this embodiment where the wiper 126 and dispenser portion 124 enclose the clear aperture 116, the rotation in the first direction 324 causes the dispenser 124 to dispense the film onto a second portion 332 of the outwardly facing surface 112 entering the clear aperture 116. Similarly rotation in the second direction causes the wiper 126 to dislodge any contaminants entrained in the film or adhered to the second portion of the outwardly facing surface 112 while moving out of the clear aperture 116.

Figure 4:
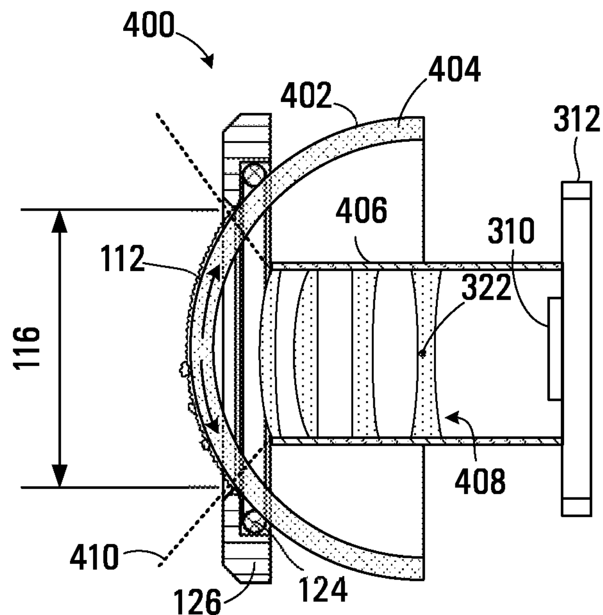
FIG. 4 is a cross-sectional view of yet another embodiment of an apparatus for protecting an optical device from contamination.

Referring to FIG. 4, another embodiment of an apparatus for protecting an optical device is shown at 400. In this embodiment a window 402 has a curved wall 404 that extends beyond the clear aperture 116, but is truncated behind the wiper 126 and dispenser 124. The window 402 is curved about a rotational axis 322 and is also curved in an orthogonal direction to the rotational axis. The window 402 is thus configured as a truncated shell, or in this specific embodiment a hemispherical shell. A lens tube 406 and lenses 408 are disposed in generally the same position with respect to the outwardly facing surface 112. However, in this embodiment the lens tube 406 extends up to the optical device 312, which supports the optical device 312 in a fixed relation to the lens tube 406. The lens 318 (shown in FIG. 3) and the optical device 312 may be moved forwardly toward a rear end of the lens tube 406. The configuration provides a similar field of view 410 as for the FIG. 3 embodiment.

Operation during a cleaning cycle is generally similar to the FIG. 3 embodiment, except that only the window 402 undergoes reciprocating rotation and the lens tube 406 and optical device 312 remain stationary. This embodiment thus provides for un-interrupted operation of the optical device 312.

Figure 5:
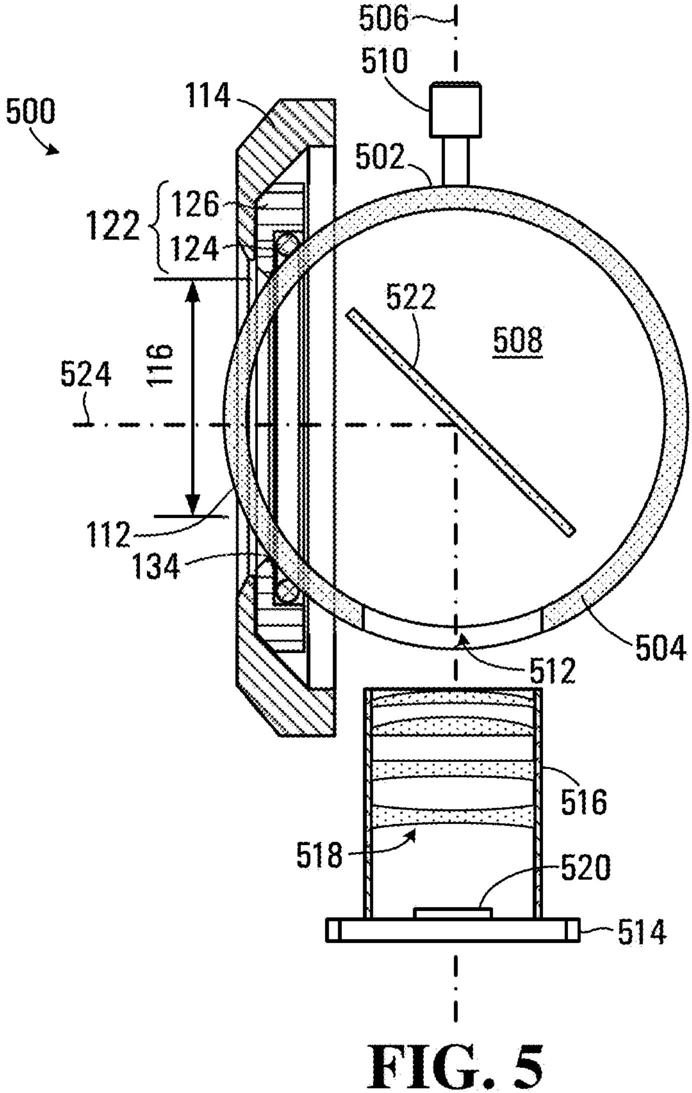
FIG. 5 is a cross-sectional view of an alternative embodiment of an apparatus for protecting an optical device from contamination.

Referring to FIG. 5, a further embodiment of an apparatus for protecting an optical device is shown at 500. In this embodiment a window 502 has a curved wall 504 that extends about a rotational axis 506. The window 502 is curved about a rotational axis 506 and is also curved in an orthogonal direction to the rotational axis. The window 502 is thus configured as a spherical shell having an enclosed region 508 within the curved wall 504. The curved wall 504 includes an opening 512 that is located concentrically with respect to the rotational axis 506. An optical device 514 is disposed laterally with respect to the window 502 and includes a lens tube 516 for mounting one or more lenses 518 (in this case a plurality of lenses) for conditioning and/or directing light onto a sensor 520. In the embodiment shown, an optical element 522 in the form of a mirror is disposed within the region 508 enclosed by the curved wall 504. In this embodiment the mirror 522 is disposed at 45° to an imaging axis 524. The mirror 522 includes a reflective surface that redirects light captured through the clear aperture 116 that impinges on the reflective surface and directs the light through the opening 512. The light passing through the opening 512 passes through the lens tube 516 and onto the sensor 520. The opening 512 is sized to prevent light that is redirected by the mirror 522 from impinging on portions of the curved wall 504.

One advantage associated with the embodiment shown in FIG. 5 is that the light passes through only a single thickness of the curved wall 504 of the window 502. As disclosed above, the solid spherical window of FIG. 1A-1C may impose some optical design constraints that may be reduced or avoided in this embodiment. While a single optical element 522 is shown in FIG. 5, the curved wall 504 may be configured to receive one or more optical elements including an element such as a lens, a curved mirror, prisms, and other optical elements. In some embodiments, the size of the optical device 514 may facilitate mounting of the optical device either partially or entirely within the region 508.

During a cleaning cycle, rotation of the window 502 is caused by a torque delivered by an actuator 510 in a direction about the rotational axis 506. During rotation, the opening 512 remains concentrically aligned with the rotational axis facilitating uninterrupted operation of the optical device 514. The dispenser portion 124 and wiper 126 of the seal 122 may extend around the perimeter of the clear aperture 116 as described above in connection with the embodiments shown in FIGS. 1A-1C, and FIG. 2. Rotation about the rotational axis 506 may be in one direction, although reciprocating rotation may also be implemented.

In any of the embodiments described herein with reference to an optical device having a sensor for receiving light through the respective clear apertures, it should be appreciated that the optical device may alternatively include a light source that generates light and directs the light out through the clear aperture. The optical device may thus include illuminators such as a light emitting diode or laser or the like. Furthermore, the sensor may be configured for generating an image (for example, a CMOS image sensor) but may also be a photo-sensor or other detector configured to generate a signal in response to an intensity of light captured through the clear aperture or variations in frequency or phase of light impinging on the sensor. In some embodiments there may be multiple optical devices covered by the window 104. The optical device 102 may include any combination of electromagnetic radiation emitters or detectors, or multiples thereof. One example would be a camera and a light source for illuminating the field of view of the camera. Another example would be a light source such as a laser or light emitting diode and a photodetector that senses electromagnetic radiation reflected back through the window 104.

Figure 6A:
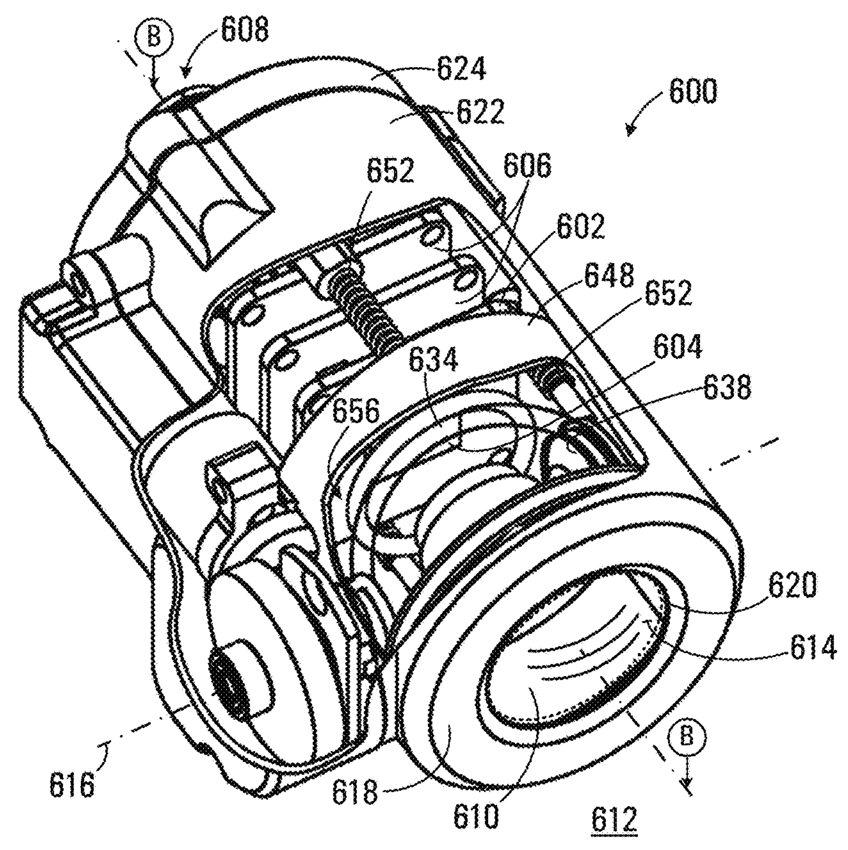
FIG. 6A is a perspective partially cut-away view of a further embodiment of an apparatus for protecting an optical device from contamination.
Figure 6B:
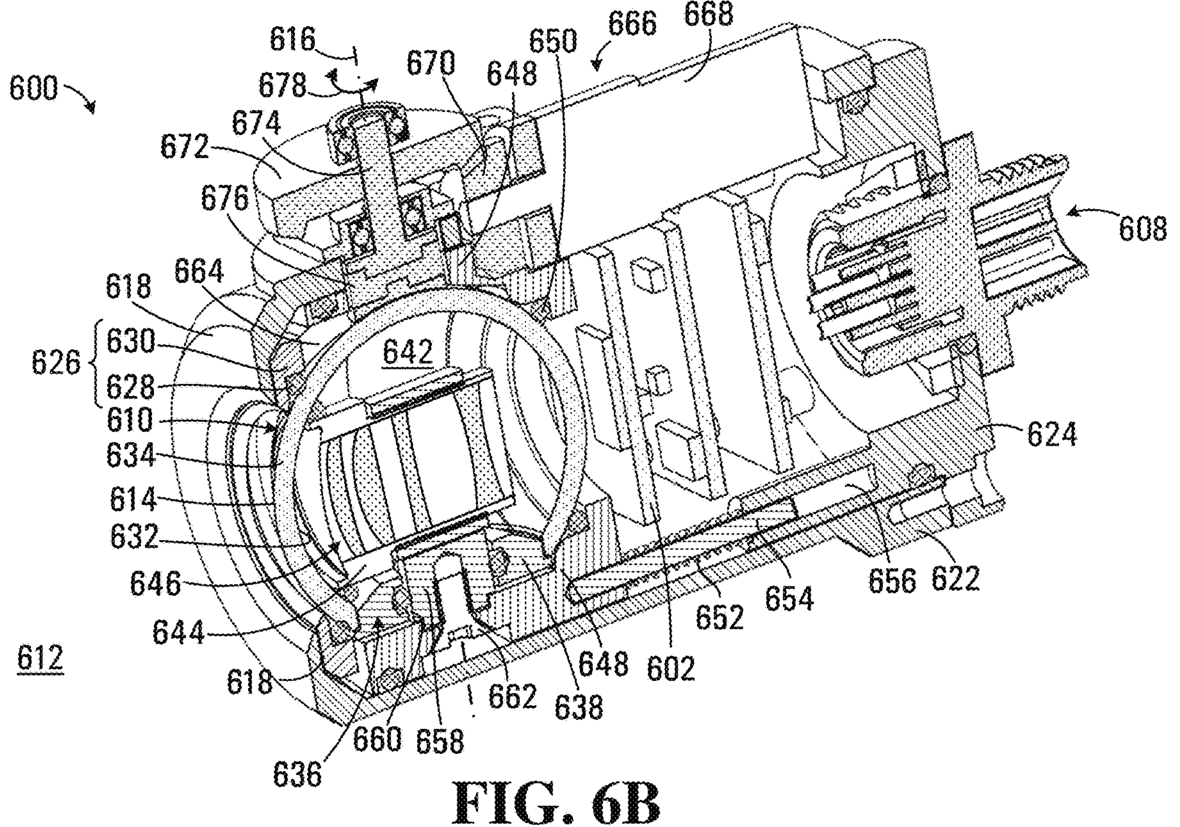
FIG. 6B is a perspective cross-sectional view of the apparatus shown in FIG. 6A taken along the line B-B.

Referring to FIG. 6A, another embodiment of an apparatus 600 for protecting an optical device 602 is shown in cut-away perspective view. The apparatus 600 is shown in FIG. 6B in cross-sectional view taken along the line B-B in FIG. 6A. In this embodiment the optical device 602 includes an image sensor 604, such as a CMOS image sensor. The apparatus 600 also includes additional image processing circuitry on circuit substrates 606 stacked behind the optical device 602 for processing image signals generated by the image sensor 604. The apparatus 600 includes an electrical connector 608, as best shown in FIG. 6B for connecting power to the optical device 602 and circuit substrates 606 and for carrying image signals back to a host system (not shown).

The apparatus 600 includes a window 610 disposed between the optical device 602 and a contaminating environment 612. In this embodiment the window 610 is configured as a hollow spherical shell. The window 610 includes an outwardly facing surface 614 that is curved about a rotational axis 616. The outwardly facing surface 614 is also curved in a direction orthogonal to the rotational axis to define a spherical outwardly facing surface. A circular bezel 618 encloses the outwardly facing surface 614 and defines a clear aperture 620 for transmission of light to the optical device 602. In this embodiment the apparatus 600 and optical device 602 are enclosed within a housing 622 and the bezel 618 and housing are fabricated as an integral unit. In other embodiments the housing 622 and bezel 618 may be implemented as separate connected elements. The housing 622 has an opening at the rear closed off by a rear cover plate 624, which also carries the electrical connector 608. A seal 626 is mounted within the bezel 618. As described above in connection with the embodiment shown in FIGS. 1A and 1B, the seal 626 includes a dispenser portion 628 and a wiper portion 630.

As best shown in the cross sectional view of FIG. 6B, the window 610 includes an inwardly facing surface 632 that is also curved about the rotational axis 616. The inwardly facing surface 632 is further curved orthogonal to the rotational axis to define a curved wall 634 defining the spherical shell of the window 610. The spherical shell has an opening 636 in the wall 634, which receives a closure 638. The closure 638 may be secured within the opening 636 by using an adhesive to bond the closure to the wall 634. In this embodiment The curved wall 634 of the window 610 thus extends about the rotational axis 616 and defines an enclosed region 642 within the spherical shell. In this embodiment, a lens tube 644 is enclosed within the region and includes at least one optical element. In this embodiment the lens tube 644 includes a plurality of optical elements 646 for capturing light through the clear aperture 620 and directing the light onto the image sensor 604 or the optical device 602.

In this embodiment the apparatus 600 includes a cup 648 (shown partially cut away in FIG. 6A), which encloses the window 610. The cup 648 includes a rear seal 650 that engages a rear portion of the curved wall 634 of the window 610. The cup 640 is urged forwardly in the housing 622 by a plurality of springs 652. One of the plurality of springs 652 is shown in cross section in FIG. 6B. The spring 652 is received on a guide pin 654 and one end of guide pin received within a bore 656 formed in the rear cover plate 624. The other end of the guide pin 654 is threaded into the rear of the cup 648. When the rear cover plate 624 is inserted into the housing 622, the spring urges the cup 648 toward the bezel 618 causing the rear seal 648 to bear on the window 610 and thus also urging the outwardly facing surface 614 of the window 610 into contact with the dispenser portion 628 of the seal 626. The springs 652, guide pin 654, and bore 656 act as a compliant structure that acts on the window 610 to provide a force for urging the window into contact with the bezel 618.

The lens tube 644 is mounted within a lens support structure 658, which extends through the opening 636 into the enclosed region 642. The lens support structure 658 can be sealingly received within a bore 660 in the closure 638 and is secured to the cup 648 via a fastener 662. The lens support structure 658 supports the lens tube 644 and plurality of optical elements 646 in fixed relation to the optical device 602. In the embodiment shown the optical device 602 may be secured to the rear cover plate 624, which has the advantage of providing for easy assembly and disassembly of the apparatus 100. In other embodiments where more precise registration between the lens support structure 658 and the optical device 602 is required, the optical device may be secured to the cup 648.

An interior region between the cup 640 and the curved wall 634 of the window 610 defines a liquid reservoir 664 for containing a liquid that is dispensed as a film onto the clear aperture 620 to reduce bonding of optical contaminants to the outwardly facing surface 614. The liquid reservoir 664 is in liquid communication with the dispenser portion 628 of the seal 626, which is configured to dispense a thin film of liquid under the seal during relative rotation between the window and the bezel while containing liquid in the liquid reservoir when there is no rotation between the window and the bezel.

In this embodiment the liquid reservoir 664 extends all around the curved wall 634 of the window 610 from the dispenser portion 628 of the seal 626 to the rear seal 650. The seals 628 and 650 thus contain the liquid within the liquid reservoir 664 and prevent the liquid reaching other portions of the housing 622, such as the optical device 602.

The volume of the liquid reservoir 664 may be configured to contain sufficient liquid to facilitate operation of the device through a reasonable number of cleaning cycles. In one embodiment the contained volume of liquid may be sufficient for the service lifetime of the apparatus 600. In other embodiments the housing may include a port (not shown) for periodically replenishing the liquid.

The apparatus 600 further includes an actuator 666, which is operable to cause relative rotation between the window 610 and the bezel 618 to cause the outwardly facing surface 614 to move with respect to the bezel. In this embodiment the actuator 666 includes a motor 668, which is coupled via a pair of gears 670 and 672 to a shaft 674. The shaft 674 is coupled through an opening 676 in the cup 648 to the wall 634 of the spherical shell window 610. When the motor 668 is activated, a torque is delivered via the gears 670 and 672 to the shaft 674, which causes the window 610 to rotate in a direction 678 about the rotational axis 616. The liquid in the liquid reservoir 664 wets the dispenser portion 628 and wiper portion 630, which reduces rotational friction while the 628 dispenses a liquid film on a portion of the outwardly facing surface 614 that enters the clear aperture 620.

The closure 638 in the opening 636 in the wall 634 of the window 610 seals off the enclosed region 642 and prevents liquid from the liquid reservoir 664 reaching the lens tube 644. In another embodiment an immersion liquid may be received within the enclosed region 642. The immersion liquid may be selected to have a refractive index that is substantially matched to a refractive index of the window 610, thus reducing interior reflections between optical surfaces in the enclosed region and reducing the potential for optical aberrations. The refractive index of the immersion liquid need not be an exact match and as long as the immersion liquid has a refractive index that is closer to the refractive index of the optical materials of the window and optical elements than air (refractive index of around 1.0), reflections and aberrations will be at least somewhat reduced.

In the embodiment shown in FIGS. 6A and 6B, the optical device 602 is disposed outside the enclosed region 642, with the lens tube 644 and optical elements 646 associated with the optical device 602 being disposed inside the enclosed region. In other embodiments where the size of the optical device 602 permits, the optical device may also be disposed within the enclosed region 642 (not shown).

Figure 7A:
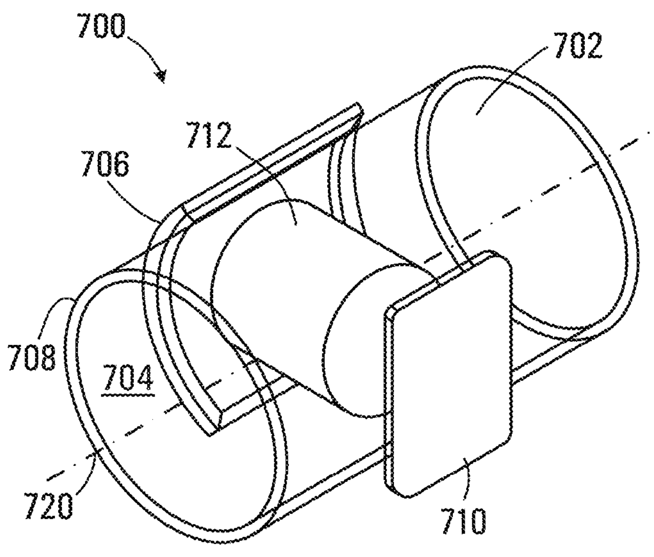
FIG. 7A is a perspective view of an alternative embodiment of an apparatus for protecting an optical device from contamination.
Figure 7B:
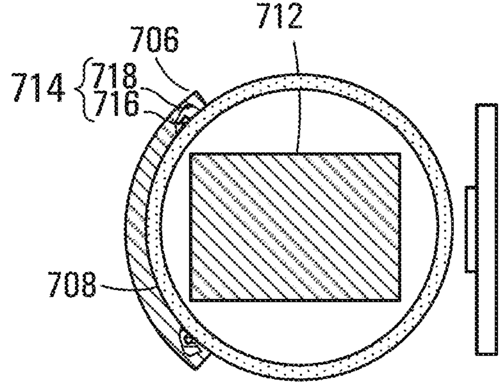
FIG. 7B is a cross-sectional view of the apparatus shown in FIG. 7A.

Referring to FIG. 7A, a further embodiment of an apparatus for protecting an optical device is shown at 700. The apparatus 700 includes a window 702 configured as a cylindrical shell. The cylindrical shell window 700 encloses a region 704. A cylindrically shaped bezel 706 is disposed in contact with an outwardly facing cylindrical surface 708 of the window 702. The apparatus 700 also includes an optical device 710. The apparatus 700 also includes a lens tube 712 disposed within the region 704 for conditioning and directing light directed to or from the optical device 710. The apparatus 700 is shown in cross sectional view in FIG. 7B. The cylindrically shaped bezel 706 includes a seal 714, including a dispenser portion 716 and wiper 718 generally configured as described above. In operation, the window 702 is rotated about a rotational axis 720 to perform similar cleaning operations to those described above in connection with other disclosed embodiments. The seal 714 in this embodiment would have a generally rectangular shape rather than the circular shape of the seal 122 described above for the spherical shaped window 104.

In general, for the embodiments disclosed herein the outwardly facing surface of the window is curved in at least one direction, but is not necessarily circularly curved. A non-circular curvature of an outwardly facing surface of a window would result in a shape of seal that is not necessarily circular. For example the seal could be elliptical or even irregularly shaped. Fabrication of an irregular or non-circular seal may be simplified by starting out by fabricating a circular seal having a circumference selected to correspond to the desired overall length of the non-circular seal. The material of the circular seal may be selected to be sufficiently compliant to enable the seal to be deformed into the non-circular or irregular shape. As an example, the seal may be housed in a grooved bezel that has the non-circular or irregular desired shape and causes the circular seal to conform within the groove. In many embodiments the seal has a wiper portion that should be sufficiently uniform to prevent lifting of the edges of the wiper portion around the periphery of the seal that would permit debris to enter the liquid reservoir. Fabricating a non-circular or irregular seal with sufficient uniformity may be more challenging than fabricating a circular seal.

Figure 8A:
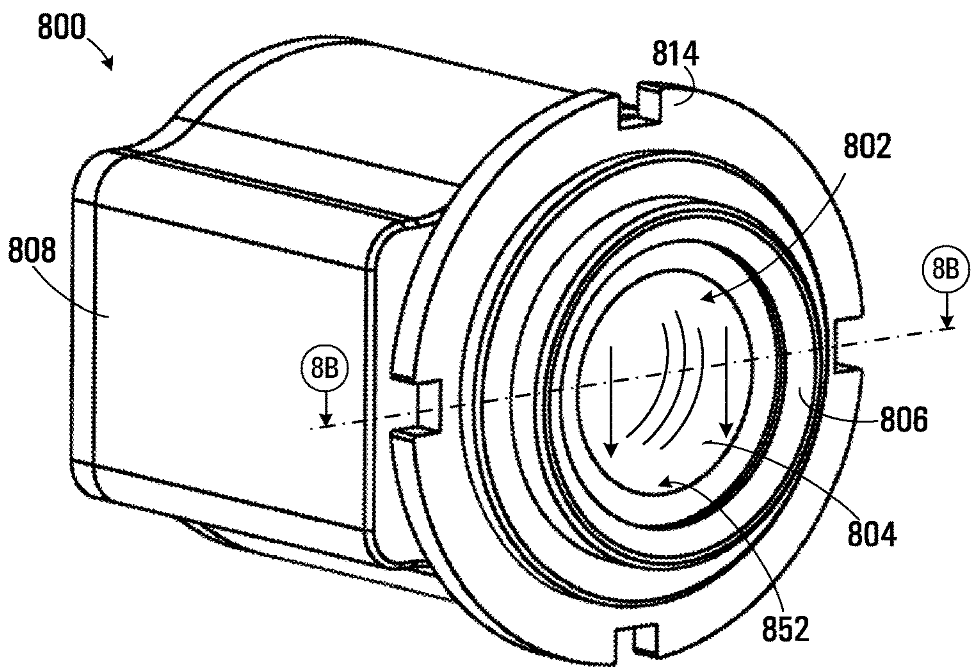
FIG. 8A is a perspective view of a further embodiment of an apparatus for protecting an optical device from contamination.
Figure 8B:
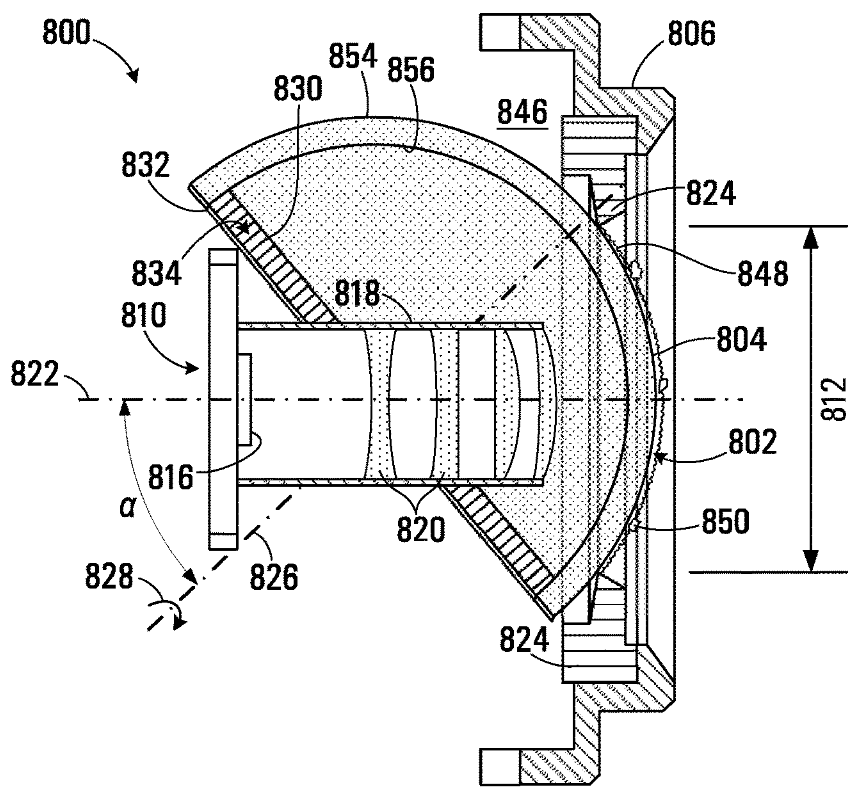
FIG. 8B is a cross-sectional view of the apparatus shown in FIG. 8A.

Referring to FIG. 8A and FIG. 8B, an embodiment of an apparatus for protecting an optical device from contamination is shown in perspective view at 800. The apparatus 800 includes a window 802 that has an outwardly facing surface 804 enclosed by a bezel 806, which is attached to a housing 808. The housing 808 encloses an optical device 810 (shown in FIG. 8B). The bezel 806 defines a clear aperture 812 for transmission of light to or from the optical device 810. The bezel 806 also includes a mounting flange 814 for mounting the apparatus 800.

The bezel 806, the window 802, and the optical device 810 are shown in a top sectional view in FIG. 8B. Referring to FIG. 8B, in this embodiment the optical device 810 includes an image sensor 816 and a lens tube 818 including lenses 820 for forming an image on the image sensor. The optical device 810 has an optical axis 822 extending perpendicular to a front surface of the image sensor 816. While in this embodiment the optical device 810 provides imaging functions, in other embodiments the optical device may be configured to perform an optical function other than imaging.

The bezel 806 includes a seal 824 extending around a periphery of the clear aperture. In this embodiment the window 802 is configured as a truncated spherical shell. The window 802 is urged into contact with the seal 824 to provide a circular line of contact with the outwardly facing surface 804 that defines the clear aperture 812. The window 802 is mounted for rotation about a rotational axis 826, which in this embodiment is angled at an acute angle $\alpha$ with respect to the optical axis 822. This is in contrast to the above disclosed embodiments, in which the relative rotation is about a rotational axis that is perpendicular to the optical or imaging axis of the respective optical devices. The window 802 includes an annular gear 830 mounted within a periphery 832 of the shell such that a toothed surface 834 of the gear is inwardly directed with respect to the shell. Rotation of the window 802 about the rotational axis 826 changes a portion of the truncated shell that is disposed within the clear aperture 812. In this embodiment the window 802 is configured as a hemispherical shell, but in other embodiments may be truncated to provide a spherical shell that is smaller than a hemisphere or larger than a hemisphere.

Figure 8C:
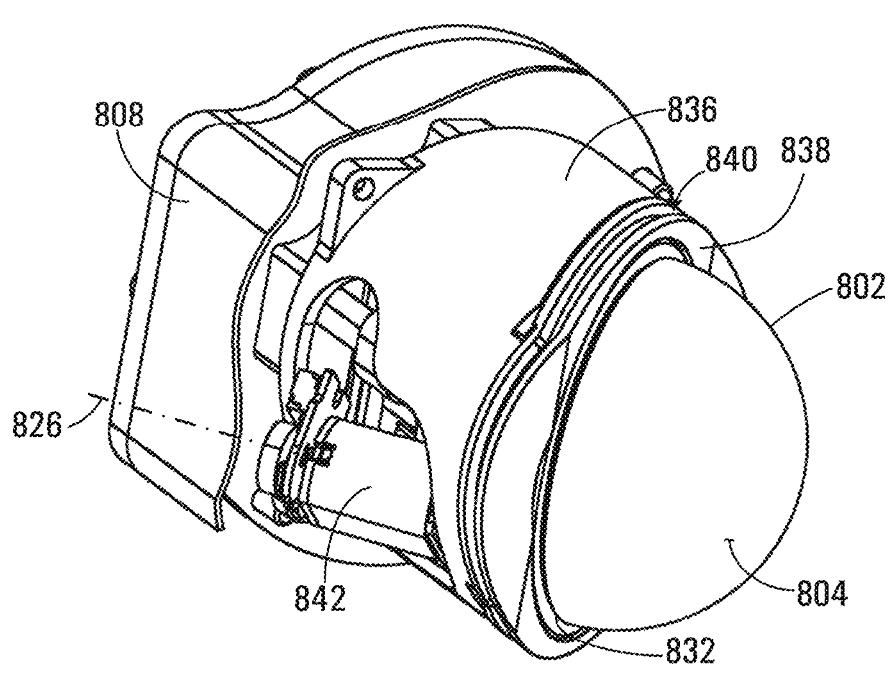
FIG. 8C is a partially cut away perspective view of the apparatus shown in FIG. 8A.

The apparatus 800 is shown in perspective view with the housing 808 partially cut away in FIG. 8C to reveal elements within the housing. Referring to FIG. 8C, the apparatus 800 includes a cup 836 and a bushing 838, which are both disposed internally within the housing 808. The cup 836 at least partially encloses the optical device 810. The window 802 is received in a front facing groove of the bushing 838, which facilitates rotation of the window about the rotational axis 826. The bushing 838 also includes a groove 840 that receives a seal (not shown). The cup 836 is mounted within the housing 808 and engages the bushing 838, which provides a force for urging the window 802 into engagement with the seal 824. The seal 824 is configured to be sufficiently compliant to deflect slightly under the urging force provided by the cup 836 thus ensuring contact between the seal and the outwardly facing surface 804 of the window. The seal in the groove 840 seals between the outer periphery of the bushing 838 and the housing.

Figure 8D:
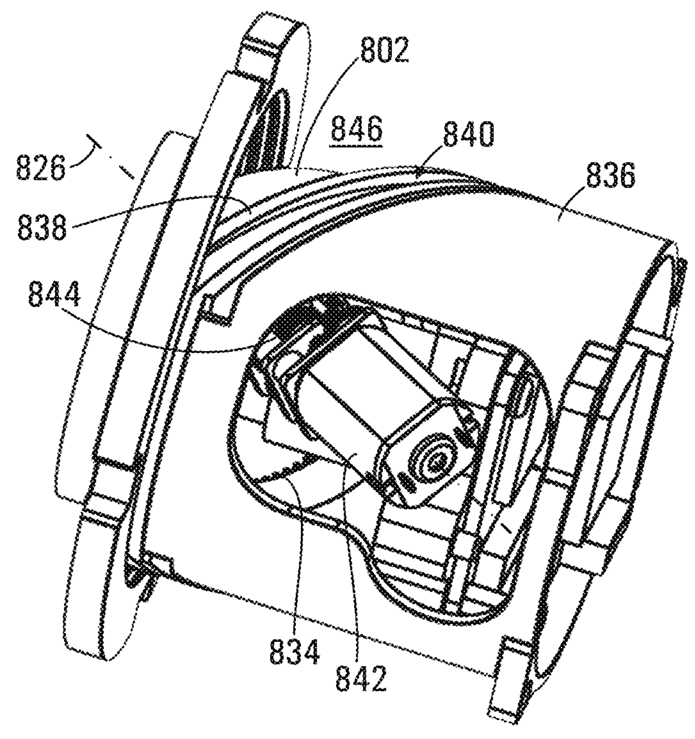
FIG. 8D is a rear perspective view of a portion of the apparatus shown in FIG. 8A.

The apparatus 800 also includes an actuator motor 842. Referring to FIG. 8D, the actuator motor 842 is coupled to a sprocket 844 that engages the toothed surface 834 of the annular gear 830. When the motor 842 is actuated the sprocket 844 rotates causing the window 802 to rotate within the bushing 838 causing relative rotation between the window 802 and the bezel 806 to cause the outwardly facing surface 804 to move with respect to the bezel. Referring back to FIG. 8B, the window 802 thus moves with respect to the bushing 838 and bezel 806 causing the outwardly facing surface 804 to move through the clear aperture 812 defined by the seal 824. For a direction of rotation about the rotational axis 826 indicated by the arrow 828 in FIG. 8B, the movement of the window 802 will be in a generally downward direction (i.e., into the plane of the page in FIG. 8B or in the direction of the arrows shown in FIG. 8A).

During movement of the window 802 the seal 824 is configured to dispense a film 848 onto the outwardly facing surface 804 of the window 802 as it emerges under the seal 824 and enters the clear aperture 812. The film 848 reduces bonding of optical contaminants to the outwardly facing surface 804 while transmitting light to or from the optical device 810 through the clear aperture 812. The seal 824 is also configured to dislodge contaminants entrained in the film 848 or adhered to a portion of the outwardly facing surface 804 moving out of the clear aperture 812 during the rotation.

In one embodiment, the bushing 838 and housing 808 together define a liquid reservoir 846 located forwardly in the housing for holding a liquid. The liquid reservoir 846 extends around the periphery 832 of the window 802 and the seal within the groove 840 of the bushing 838 retains the liquid within the reservoir and prevents liquid from reaching other components of the apparatus 800 such as the optical device 810. The reservoir is in liquid communication with the seal 824 and the liquid is dispensed under the seal 824 during rotation of the window to form the film 848 on the outwardly facing surface 804 of the window. In other embodiments, the liquid may include liquid and non-liquid constituents, or the seal may dispense a non-liquid material by abrasion from the seal to form the film 848, as described in more detail above.

Still referring to FIG. 8B, the angle α between the optical axis 822 and the rotational axis 826 of the window 802 is selected to pass through a point outside the clear aperture 812. This has the effect during rotation of causing the emerging portion of the hemispherical surface of the 802 to completely replace the outwardly facing surface 804 that had been previously exposed to contaminants. If the rotational axis 826 were to pass through a point within the 812, a small portion of the outwardly facing surface 804 would not be cleaned or have the film 848 replenished during rotation.

In one embodiment the seal 824 may be implemented using a polyurethane material having a Shore Hardness of about 50 D, which is sufficiently compliant to provide the force for urging the window 802 into contact with the seal. In the embodiment of the apparatus 800 shown in FIG. 8A-8D, the springs and/or adjustments shown for the embodiment of FIGS. 6A and 6B are omitted and the compliant structure for urging the window 802 into contact with the bezel 806 is provided by the compliance of the seal 824.

Additionally, in this embodiment the seal 824 performs both the liquid dispensing and wiping functions and does not include an additional dispenser portion (such as shown in FIG. 6B at 628). However, in some embodiments the additional liquid dispensing element may be implemented for reducing the amount of fluid dispensed onto the outwardly facing surface 804. In applications where the outwardly facing surface 804 of the window 802 is not likely to be exposed to tenacious contaminants such as tree sap or resin, the reduction in dispensed fluid during each cleaning cycle extends an operating time prior to requiring replenishment of the liquid in the liquid reservoir 846. In some embodiments, the liquid reservoir 846 may accommodate sufficient liquid to provide sufficient cleaning cycles to last for the full operating lifetime of the apparatus 800.

As disclosed above, for the direction of rotation about the rotational axis 826 indicated by the arrow 828 in FIG. 8B, the movement of the window 802 will be in a generally downward direction. This direction of rotation has the advantage of causing contaminants 850 that become entrained in the film 848 to be moved downwardly within the clear aperture 812 to accumulate at a lower edge 852 of the seal 824. Gravitational forces subsequently prevent removed contaminants 852 from re-distributing onto the outwardly facing surface 804.

The hemispherical shell window 802 has the advantage of being manufacturable by conventional optical fabrication techniques, thus potentially reducing a manufacturing cost of the window. In one embodiment the hemispherical shell may have a diameter of about 40 mm and an overall diameter of the housing 808 may be about 60 mm. In the embodiment shown in FIG. 8A-8D the window 802 has a spherical shaped outwardly facing surface 854 and a spherical shaped inwardly facing surface 856. In other embodiments the inwardly facing surface 856 may have an aspherical surface shape which acts together with the lenses 820 to direct light to or from the optical device 810.

The above disclosed embodiments may be implemented in an optical system that integrates a window protection and cleaning function without substantially increasing an overall size of the housing. Compact optical systems are of importance for some applications where there is limited space available, or the system is intended to be relatively inobtrusive or inconspicuous. The spherical shape of the window permits the wiper and dispenser of the seal to be fabricated on a lathe, which avoids complex CNC machining of seal components that may be required in other cleaning systems where a non-spherical or flat window is used.

While specific embodiments have been described and illustrated, such embodiments should be considered illustrative only and not as limiting the disclosed embodiments as construed in accordance with the accompanying claims.

What is claimed is:

1. An apparatus for protecting an optical device from contamination, the apparatus comprising:

a window disposed between the optical device and a contaminating environment, the window being rotatable about a rotational axis and including a spherical outwardly facing surface;

a bezel enclosing a portion of the outwardly facing surface and defining a clear aperture for transmission of electromagnetic radiation to or from the optical device, the bezel including a seal extending around a periphery of the clear aperture, the bezel being configured to cause the seal to conform to the outwardly facing surface when the window and the bezel are urged into contact with each other; and an actuator configured to cause rotation of the window to cause the outwardly facing surface to move with respect to the bezel through the clear aperture, the rotational axis being inclined at an acute angle relative to an optical axis of the optical device, wherein the seal is configured to dispense a film onto a portion of the outwardly facing surface that enters the clear aperture during the rotation of the window, the film being operable to reduce bonding of contaminants to the outwardly facing surface within the clear aperture while transmitting the electromagnetic radiation to or from the optical device through the clear aperture; and wherein the seal is configured to dislodge contaminants entrained in the film or adhered to a portion of the outwardly facing surface moving out of the clear aperture during the rotation of the window.

2. The apparatus of claim 1 wherein the film comprises a liquid film that remains in a liquid state after being dispensed.

3. The apparatus of claim 2 further comprising a liquid reservoir in liquid communication with the seal and wherein the seal is configured to dispense a thin film of liquid under the seal during rotation of the window while containing liquid in the liquid reservoir when there is no rotation of the window and the bezel.

4. The apparatus of claim 3 wherein the window and the optical device are enclosed within a housing and wherein the liquid reservoir is defined within a portion of the housing extending from the seal in the bezel, along a portion of the outwardly facing surface of the window that is disposed within the housing, and to a rear seal disposed to contain the liquid in the liquid reservoir and to prevent the liquid reaching other portions of the housing.

5. The apparatus of claim 1 wherein the film comprises one of:

a liquid material that at least partly cures after being dispensed;

a liquid material and a non-liquid material, the liquid material being operable to at least partially evaporate after being dispensed; or a non-liquid material that is dispensed by being abraded from the seal to form the film during the rotation of the window.

6. The apparatus of claim 1 wherein the seal comprises:

a dispenser portion operable to dispense the film onto the portion of the outwardly facing surface that enters the clear aperture during rotation of the window; and a wiper portion operable to dislodge the contaminants entrained in the film or adhered to the portion of the outwardly facing surface moving out of the clear aperture during rotation of the window.

7. The apparatus of claim 6 wherein the dispenser portion of the seal and the wiper portion of the seal are disposed at opposite sides of the bezel and the rotation of the window is in a direction to cause the outwardly facing surface to move toward the wiper portion of the seal.

8. The apparatus of claim 6 wherein the wiper portion of the seal comprises a wiper extending around a full periphery of the clear aperture and wherein the dispenser portion of the seal comprises a separate seal disposed spaced outwardly from the wiper.

9. The apparatus of claim 1 wherein the optical device and the window are enclosed within a housing and wherein the bezel comprises a portion of the housing.

10. The apparatus of claim 1 further comprising a compliant structure acting on the window and configured to provide a force for urging the window into contact with the bezel.

11. The apparatus of claim 6 wherein the actuator is configured to cause rotation of the window in a single direction about the rotational axis and wherein the rotation causes the seal to dislodge contaminants from the portion of the outwardly facing surface moving out of the clear aperture while the dispenser portion of the seal replenishes the film on the portion of the outwardly facing surface entering the clear aperture.

12. The apparatus of claim 1 wherein the window comprises a spherical solid and wherein the optical device is disposed behind the spherical solid and wherein the electromagnetic radiation is transmitted to or from the optical device through the clear aperture and the spherical solid.

13. The apparatus of claim 12 further comprising a volume of immersion liquid contained between a portion of the spherical solid and a first optical element of the optical device, the immersion liquid having a refractive index that closely matches a refractive index of the spherical solid.

14. The apparatus of claim 12 wherein the spherical solid comprises a recess within the spherical solid and wherein the optical device is at least partially disposed within the recess.

15. The apparatus of claim 1 wherein the window comprises a spherical inwardly facing surface defining a spherical shell between the outwardly facing surface and the inwardly facing surface.

16. The apparatus of claim 15 wherein the spherical shell extends beyond the clear aperture and wherein the actuator is configured to cause a reciprocating rotation of the window about the rotational axis, wherein rotation in a first direction causes the seal to dislodge contaminants when a first portion of the outwardly facing surface moves out of the clear aperture and wherein rotation in a second direction causes the seal to dispense the film onto the first portion of the outwardly facing surface while reentering the clear aperture.

17. The apparatus of claim 16 wherein the rotation in the first direction causes the seal to dispense the film onto a second portion of the outwardly facing surface entering the clear aperture and wherein the rotation in the second direction causes the seal to dislodge contaminants entrained in the film or adhered to the second portion of the outwardly facing surface while moving out of the clear aperture.

18. The apparatus of claim 15 wherein the spherical shell defines an enclosed region within the spherical shell and further comprising at least one optical element disposed within the enclosed region to transmit the electromagnetic radiation to the optical device.

19. The apparatus of claim 18 wherein the optical device is disposed outside the enclosed region and wherein the at least one optical element comprises one of:

one or more lenses configured to condition the electromagnetic radiation being transmitted to or from the optical device; or a mirror including a reflective surface disposed to redirect the electromagnetic radiation impinging on the reflective surface to or from the optical device.

20. The apparatus of claim 18 wherein the optical device is disposed outside the enclosed region and wherein the spherical shell comprises at least one opening and wherein the at least one optical element is mounted on a support structure extending through the at least one opening into the enclosed region to support the at least one optical element in fixed relation to the optical device.

21. The apparatus of claim 18 wherein the spherical shell is configured to contain an immersion liquid within the enclosed region, the immersion liquid having a refractive index that is substantially matched to a refractive index of the window.

22. The apparatus of claim 18 wherein the optical device is disposed within the enclosed region.

23. The apparatus of claim 18 wherein the spherical shell comprises at least one opening and further comprising a closure disposed to seal the at least one opening.

24. The apparatus of claim 1 wherein the electromagnetic radiation transmitted to or from the optical device comprises electromagnetic radiation having a wavelength in at least one of:

an ultraviolet range of wavelengths;
a visible range of wavelengths;
an infrared range of wavelengths;
a long-Wave infrared range of wavelengths; or
an x-ray range of wavelengths.

25. The apparatus of claim 1 wherein the actuator is configured to cause one of:

a continuous rotation;
an intermittent rotation; or
a rotation in one direction followed by a rotation in an opposite direction.

26. The apparatus of claim 1 wherein the window comprises one of a spherical inwardly facing surface or an aspherical inwardly facing surface.

27. The apparatus of claim 26 wherein the optical device is disposed behind the one of the spherical inwardly facing surface or the aspherical inwardly facing surface.

28. The apparatus of claim 1 wherein the rotational axis passes through a point outside of the clear aperture.

29. The apparatus of claim 1 wherein a direction of rotation of the window about the rotational axis is selected to cause the window to move in a direction with respect to the bezel such that the contaminants move downwardly out of the clear aperture.

30. The apparatus of claim 1 further comprising a second actuator configured to generate a secondary motion to dislodge at least some contaminants built up at a periphery of the clear aperture.

31. The apparatus of claim 1 wherein the seal is fabricated in a circular shape and wherein the seal is mounted within the bezel to cause the seal to be urged into a non-circular shape.

32. The apparatus of claim 1 wherein the optical device comprises a plurality of optical devices configured to emit or receive the electromagnetic radiation.

33. The apparatus of claim 1 wherein the rotational axis is inclined at an angle of about 45° relative to the optical axis of the optical device.

34. The apparatus of claim 1 wherein the rotational axis is inclined at an angle of between 30° and 60° relative to the optical axis of the optical device.

* * * * *